United States Patent
Kumar et al.

(10) Patent No.: US 10,229,224 B2
(45) Date of Patent: Mar. 12, 2019

(54) SYSTEMS AND METHODS FOR SELECTING PROCESS ELEMENT VARIANTS IN BUSINESS PROCESSES

(71) Applicant: Infosys Limited, Bangalore (IN)

(72) Inventors: Neeli Basanth Kumar, Hyderabad (IN); Manish Kumar, Bangalore (IN)

(73) Assignee: Infosys Limited, Bangalore (IN)

( * ) Notice: Subject to any disclaimer, the term of this patent is extended or adjusted under 35 U.S.C. 154(b) by 506 days.

(21) Appl. No.: 14/490,490

(22) Filed: Sep. 18, 2014

(65) Prior Publication Data
US 2015/0081731 A1   Mar. 19, 2015

(30) Foreign Application Priority Data

Sep. 19, 2013   (IN) ............................ 4215/CHE/2013

(51) Int. Cl.
*G06F 17/30* (2006.01)
*G06Q 10/06* (2012.01)
*G06Q 30/02* (2012.01)

(52) U.S. Cl.
CPC ....... *G06F 17/30988* (2013.01); *G06Q 10/06* (2013.01); *G06F 17/30424* (2013.01); *G06F 17/30657* (2013.01); *G06F 17/30864* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 7,730,446 B2 | 6/2010 | Anonsen et al. | |
| 2002/0026339 A1* | 2/2002 | Frankland | C10G 65/04 705/7.12 |
| 2003/0120593 A1* | 6/2003 | Bansal | G06F 17/30873 705/39 |
| 2004/0267704 A1* | 12/2004 | Subramanian | G06F 17/30386 |
| 2005/0021541 A1* | 1/2005 | Rangadass | G06Q 10/06 |
| 2005/0204340 A1 | 9/2005 | Ruminer et al. | |
| 2006/0085374 A1 | 4/2006 | Mayes et al. | |
| 2007/0150330 A1 | 6/2007 | McGoveran | |
| 2007/0233645 A1* | 10/2007 | Peterson | G06F 17/30923 |
| 2008/0222147 A1* | 9/2008 | El Homsi | G06Q 10/06 |
| 2008/0294583 A1* | 11/2008 | Hunt | G06Q 20/0855 706/46 |
| 2008/0320486 A1 | 12/2008 | Bose et al. | |
| 2010/0114618 A1 | 5/2010 | Wilcock et al. | |

(Continued)

*Primary Examiner* — Rehana Perveen
*Assistant Examiner* — Raheem Hoffler
(74) *Attorney, Agent, or Firm* — Klarquist Sparkman, LLP

(57) ABSTRACT

The technique relates to a system and method for selecting process element variants in business processes. The technique involves receiving a process element execution request from at least one user. Then, determining a plurality of enterprise dimensions associated with the process element execution request. Thereafter, searching the process element variant corresponding to the plurality of enterprise dimensions in a declarative way based on a predefined dimensional hierarchy. Finally, selecting the process element variant for execution to accomplish the user request. This technique employs a declarative approach which eliminates the need define the variants for all possible combination of enterprise dimensions namely process, events, locations, organizations and data.

20 Claims, 9 Drawing Sheets

(56) References Cited

U.S. PATENT DOCUMENTS

2010/0161364 A1* 6/2010 Lokowandt ........ G06Q 10/0631
705/7.12
2010/0293025 A1 11/2010 Carbone et al.

* cited by examiner

SYSTEMS AND METHODS FOR SELECTING PROCESS ELEMENT VARIANTS IN BUSINESS PROCESSES

FIELD

The field relates generally to select process element variant in business processes, and in particular, to a system and method for selecting process element variants in business processes by covering all the dimensions of Zachman Framework.

BACKGROUND

A business process is a collection of interrelated activities, which accomplish a particular goal. A business process can be decomposed into process elements like sub-processes, manual and automated activities, business rules, internal business controls and data which related to a goal. Some of these process elements are statically modeled whereas others need to be invoked dynamically based on the context of execution. For these variable process elements, the choice of a particular variant of the process element depends on various dimensions like process being executed, events encountered, location of process instance, organization in which process instance is being executed and data for the process instance. Current Business Process Management Suites (BPMS) support the concept of dynamic binding of the variant using rules or some other means of querying. Dynamic binding involves configuring a "place holder" for the variant to be used and the particular variant details are passed or referenced based on the pre-defined conditions while execution.

The existing products are limited to dynamic binding of sub-processes and web services. Also the criteria for choice need to be defined at design time and at runtime the criteria would be checked and the needed variant must be made available. If the particular variant is not available, the system will raise an exception and abort the execution of the process instance. This necessitates the need to define the variants for all possible combination of enterprise dimensions namely process, events, locations, organizations and data. This effort is intensive, error prone and in some cases may not be economically viable or may not be required. Also, the possibility of dynamic binding is limited to sub-processes and service based activities, but the need is applicable for all the business models like business rules, internal business controls and data.

In view of forgoing discussion, there is a need of a declarative approach to define, configure and choose a particular variant to cater to newer developments in the enterprise while limiting the complexity and cost of maintaining the variants.

SUMMARY

The described technologies overcome the limitation mentioned above by allowing a hierarchy of the process elements to be defined and providing a declarative method which allows choosing a specific process element variant based on the execution details of the process instance. The declarative method eliminates the necessity to define complete set of rules for choosing a process element variant hence chooses the most applicable variant based on defined hierarchy of process elements. The present technique also covers all the dimensions of Zachman Framework relevant of an enterprise business processes—(sub) processes, events, locations, organizations and data. The present technique is not limited sub-processes and service based activities but also provides support to all the process elements applicable in business processes namely "(sub) processes, manual and automated activities, business rules, business internal controls.

According to an embodiment, a method for selecting a process element variant in a business process is disclosed. The method includes receiving a process element execution request from at least one user. Then, determining a plurality of enterprise dimensions associated with the process element execution request. Thereafter, searching the process element variant corresponding to the plurality of enterprise dimensions in a declarative way based on a predefined dimensional hierarchy. Finally, selecting the process element variant for execution to accomplish the user request.

In an additional embodiment, a system for selecting a process element variants in a business process is disclosed. The system includes a user request receiving module, an enterprise dimensions determination module, a process element variant search module and a process element variant selection module. The user request receiving module configured to receive a process element execution request from at least one user. The enterprise dimensions determination module configured to determine a plurality of enterprise dimensions associated with the process element execution request. The process element variant search module configured to search the process element variant corresponding to the plurality of enterprise dimensions in a declarative way based on a predefined dimensional hierarchy and the process element variant selection module configured to select the process element variant for execution to accomplish the user request.

In another embodiment, a non-transitory computer readable medium for selecting a process element variant in a business process is disclosed. This includes a computer usable medium having a computer readable program code embodied therein for selecting a process element variant in a business process. The computer readable program code adapted to receiving, a process element execution request from at least one user then determining a plurality of enterprise dimensions associated with the process element execution request thereafter searching the process element variant corresponding to the plurality of enterprise dimensions in a declarative way based on a predefined dimensional hierarchy; and finally selecting the process element variant for execution to accomplish the user request.

DRAWINGS

Various embodiments of the invention will, hereinafter, be described in conjunction with the appended drawings provided to illustrate, and not to limit the invention, wherein like designations denote like elements, and in which.

Figure 4:
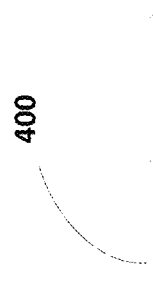
Figure 5:
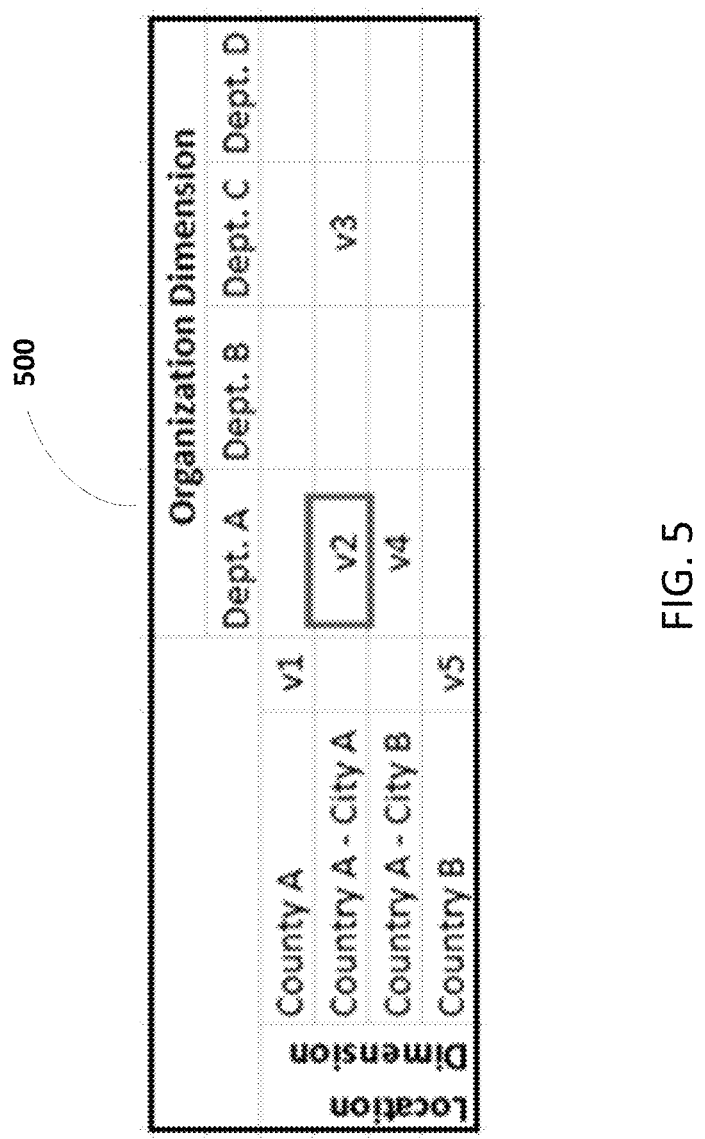
Figure 6:
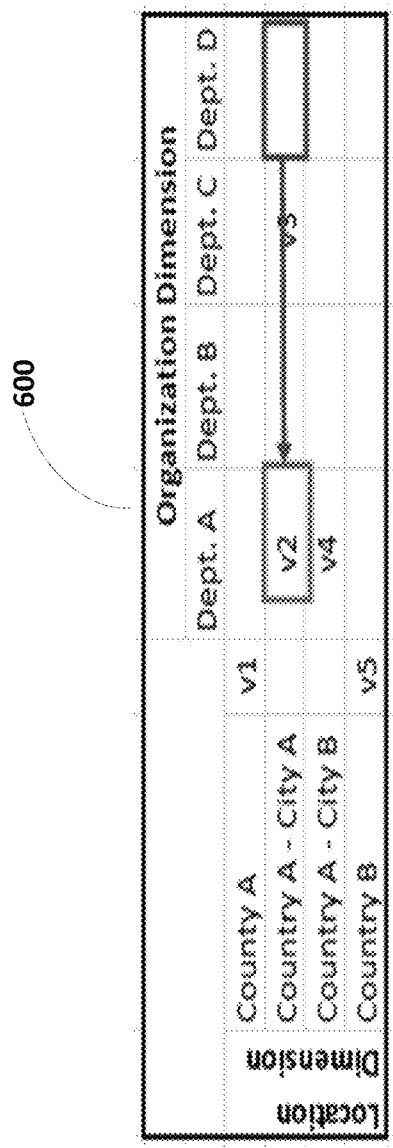
Figure 7:
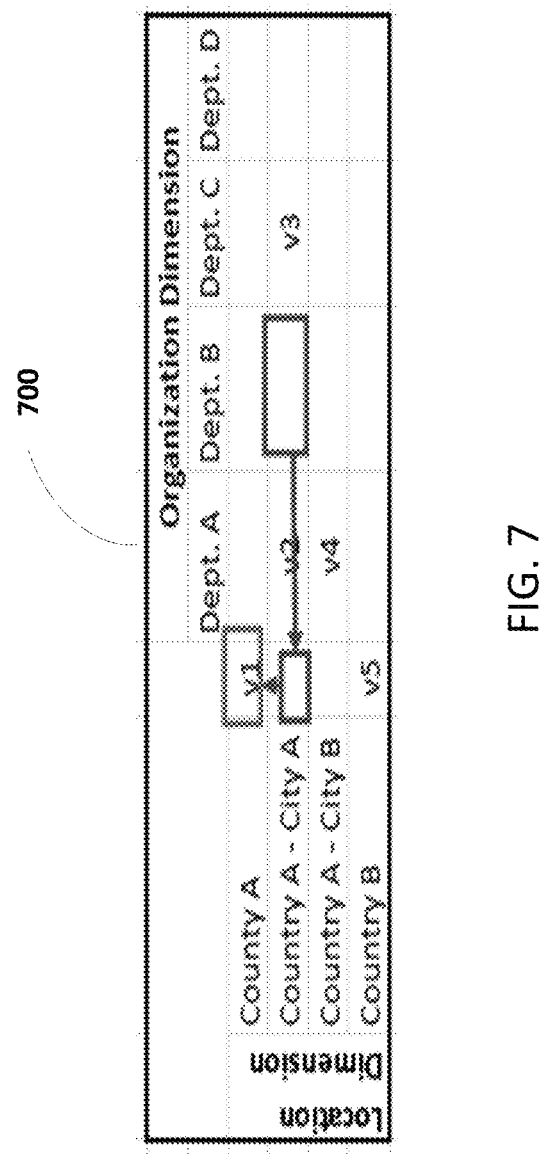
Figure 8:
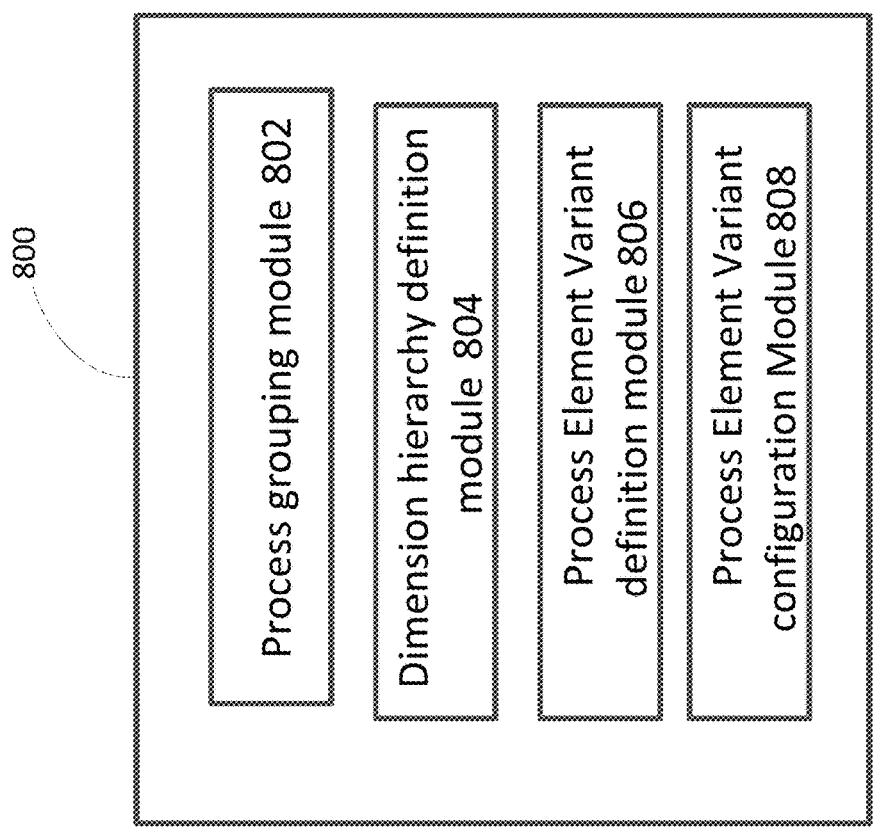

FIG. 4 depicts an exemplary credit approval process elements variants, in accordance with an embodiment of the present technique FIG. 5 depicts an exemplary process of choosing a variant satisfying all the required dimensional data, in accordance with an embodiment of the present technique FIG. 6 depicts an exemplary process of choosing a variant based on higher levels of hierarchy in the same dimension, in accordance with an embodiment of the present technique FIG. 7 depicts an exemplary process of choosing a variant based on a different dimension, in accordance with an embodiment of the present technique FIG. 8 is a block diagram illustrating a system for configuring process element variants in business processes, in accordance with an embodiment of the present technique.

Figure 9:
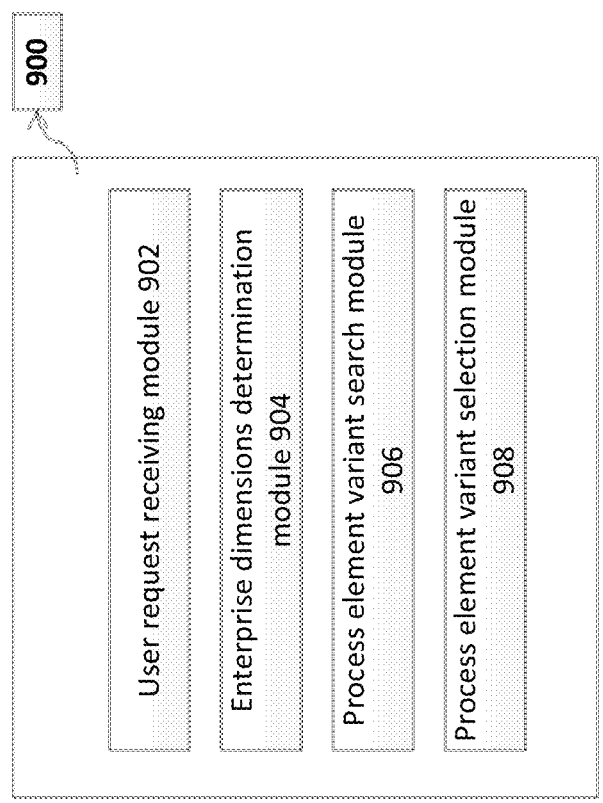

FIG. 9 is a block diagram illustrating a system for selecting process element variants in business processes, in accordance with an embodiment of the present technique.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Figure 1:
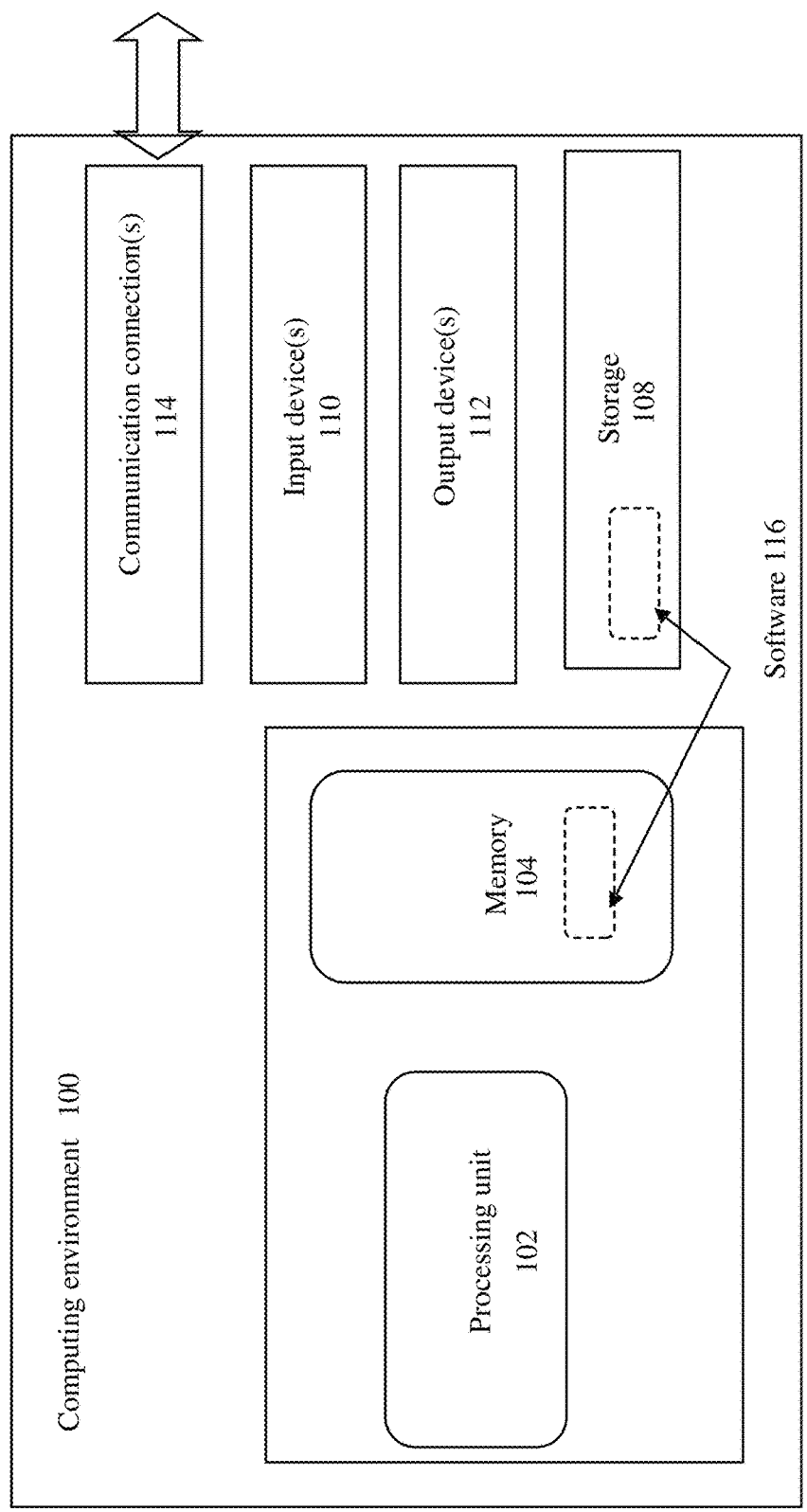
FIG. 1 is a computer architecture diagram illustrating a computing system capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, mini-computers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
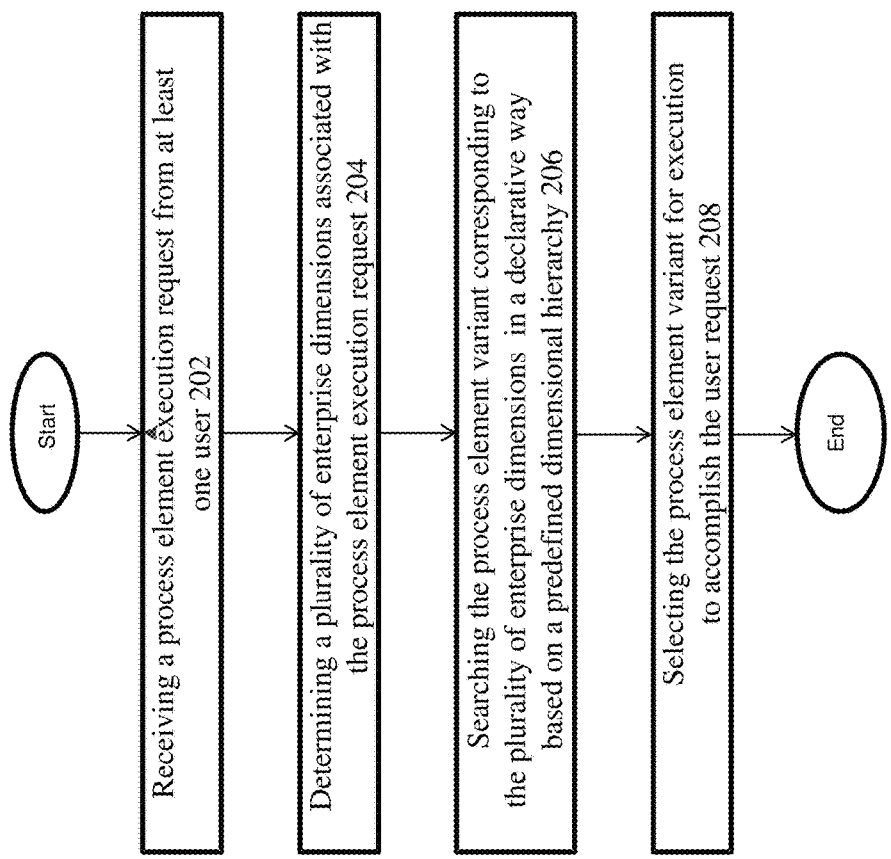
FIG. 2 is a flowchart, illustrating a method for selecting process element variants in business processes, in accordance with an embodiment of the present technique

FIG. 2 is a flowchart, illustrating a method for selecting process element variants in business processes, in accordance with an embodiment of the present technique. A process element execution request is received 202. Thereafter a plurality of enterprise dimensions associated with the process element process element execution request is determined 204. Then, the process element variant corresponding to the plurality of enterprise dimensions in a declarative way based on a predefined dimensional hierarchy are searched 206 and finally the process element variant for execution to accomplish the user request are selected 208. An exemplary algorithm for selecting a process element variant is as follows:

The variants are queried stored for applicable variant for the tuple $\{P_{init}, L_{init}, O_{init}, E_{init}, D_{init}\}$ where $P_{init}, L_{init}, O_{init}, E_{init}, D_{init}$ are the data elements from the process instance where $P_{init}, L_{init}, O_{init}, E_{init}, D_{init}$ are the data elements from the process instance wherein P is processes, L is locations, O is organization, E is events and D is data. If a variant is found satisfying all the dimensions, it is chosen for execution. If variant satisfying all the dimensions is not found then the variant queried for the tuple is $\{P_{init}, L_{init}, O_{init}, E_{init}, D_{init-1}\}$ where $D_{init-1}$ is the data for parent of $D_{init}$ in the defined hierarchy. If a variant is found satisfying these dimensions, it is chosen for execution. If variant satisfying all these dimensions is not found then, then repeated the variant queried for the tuple is $\{P_{init}, L_{init}, O_{init}, E_{init}, D_{init-i}\}$ where i<=n, n is the depth of the dimensional hierarchy. If a variant is not found, a check is made for the default variant configured for that particular dimension. If a default is not configured, the variant queried stored for the tuple $\{P_{init}, L_{init}, O_{init}, E_{init}\}$ is queried. The process continues for all the dimensions of P, L, O and E in the order as defined in the dimension hierarchy. If a variant is found, chosen it is for execution. If not, it will be reported as an exception.

Figure 3:
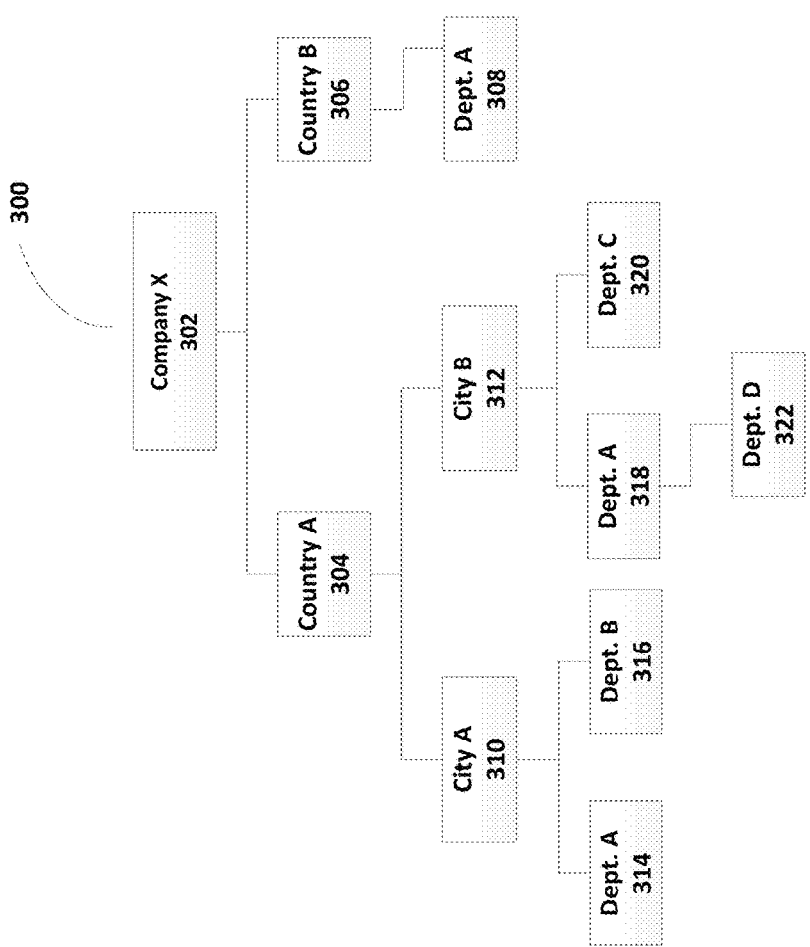
FIG. 3 depicts an exemplary process for creation of a dimensional hierarchy.

FIG. 3 depicts an exemplary process for creation of a dimensional hierarchy. According to one exemplary embodiment of the present invention, an order to cash process is depicted wherein only two dimensions namely, Location (L) and Organization (O) have been considered. The example shown is for clarity purpose only and does not intend to limit the scope of the invention in any manner. An exemplary embodiment as depicted in FIG. 3, the hierarchy of an enterprise for each group having two dimensions namely the location and organization wherein the organization dimension is tightly linked with location dimension or the way the organization is structured in a location is different from other locations. The present invention also works for the cases where the same structure repeats for all locations.

According to an exemplary embodiment of the invention company X 302 may have branches in country A 304 and country B 306. The company A 304 may have two offices in City A 310 and City B 312 wherein the City A 310 may have two departments namely Dept. A 314 and Dept. B 316. Similarly City B 312 may have two department namely Dept. A 318 and Dept. C 320 wherein Dept. A 318 may have sub department namely Dept. D 322.

FIG. 4 depicts an exemplary credit approval process elements variants 400 wherein According to another embodiment of the invention the definition and configuration of process elements have been depicted in FIG. 8. As the exemplary order to cash process mentioned earlier, a credit approval process elements variants are defined and configured as depicted in FIG. 4.

According to further exemplary embodiment of the present invention, various scenarios in the order to cash process have been taken into consideration in further embodiments. FIG. 5 depicts an exemplary process of choosing a variant satisfying all the required dimensional data 500 (Country A-Country A, Dept A). A process element execution request is received 202. Thereafter a plurality of enterprise dimensions associated with the process element process element execution request is determined 204. Then, the process element variant corresponding to the plurality of enterprise dimensions in a declarative way based on a predefined dimensional hierarchy are searched 206 and the varaint is queried for tuple (Country A-Country A, Dept A) results in V2 as shown in FIG. 5.

FIG. 6 depicts an exemplary process of choosing a variant based on higher levels of hierarchy in the same dimension 600 wherein the scenario is choosing an applicable variant for tuple {Country A-City B, Dept. D}. A process element execution request is received 202. Thereafter a plurality of enterprise dimensions associated with the process element process element execution request is determined 204. Then, the process element variant corresponding to the plurality of enterprise dimensions in a declarative way based on a predefined dimensional hierarchy are searched 206 and finally the process element variant for execution to accomplish the user request are selected 208. The variant is queried for tuple {Country A-City B, Dept. D} however it does not result in a configured variant as represented by empty box in FIG. 6. Thus a searching is performed in default process element variant if the process element variant for the plurality of enterprise dimensions is not predefined wherein the searching step continues till the process element variant is found or the plurality of enterprise dimensions are exhausted. Since Dept. D has another level in Organization dimension, {Country A-City D, Dept. A} is checked. This result in a configured variant v2 in box FIG. 6 and same is chosen.

FIG. 7 depicts an exemplary process of choosing a variant based on a different dimension 700 in accordance with an embodiment of the present technique. The scenario is choosing the applicable variant for tuple {Country A-City A, Dept. B}. A process element execution request is received 202. Thereafter a plurality of enterprise dimensions associated with the process element process element execution request is determined 204. Then, the process element variant corresponding to the plurality of enterprise dimensions in a declarative way based on a predefined dimensional hierarchy are searched 206 and finally the process element variant for execution to accomplish the user request are selected 208. The variant is queried for tuple {Country A-City A, Dept. B} however it does not result in a configured variant as represented by empty box in FIG. 7. Since Dept. B does not have further levels in Organization hierarchy, the next dimension, Location is queried. Thus a searching is performed in default process element variant if the process element variant for the plurality of enterprise dimensions is not predefined is applied for the tuple Country A-City A which results in a configured variant V1 as shown in FIG. 7.

FIG. 8 is a block diagram illustrating a system for configuring process element variants in business processes, in accordance with an embodiment of the present technique. More particularly, the system includes a process grouping module 802, a dimension hierarchy definition module 804, a process element Variant definition module 806 and a process element variant configuration Module 808. The Process grouping module 802 configured to support the grouping of plurality of processes but not limiting to function, region etc. The dimension hierarchy definition module 804 allows to configure the dimensional hierarchy for the dimensions comprising of processes, events, locations, organization and data. This hierarchy dictates the approach for selecting a process element variant. The process element Variant definition module 806 is configured to define the process element variants in a format applicable wherein the invention does not limit to a specific notation or storage. The process element variant configuration Module 808 is configured to support the configuration of the process element variants to the corresponding dimensions.

FIG. 9 is a block diagram illustrating a system for selecting process element variants in business processes, in accordance with an embodiment of the present technique. More particularly, the system includes a user request receiving module 902, an enterprise dimensions determination module 904, a process element variant search module 906 and a process element variant selection module 908. The user request receiving module 902 receives a process element execution request from at least one user. The enterprise dimensions determination module 904 determines a plurality of enterprise dimensions associated with the process element execution request. The process element variant search module 906 searches the process element variant corresponding to the plurality of enterprise dimensions in a declarative way based on a predefined dimensional hierarchy. Finally, the process element variant selection module 908 selects the process element variant for execution to accomplish the user request.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A computer-implemented method executed by one or more computing devices for selecting a process element variant in a business process comprising:

configuring, by at least one of the one or more computing devices, a dimensional hierarchy for a plurality of enterprise dimensions, wherein an enterprise dimension has a set of possible values and the dimensional hierarchy is based on the respective sets of possible values for the plurality of enterprise dimensions, further wherein the dimensional hierarchy defines an order for the plurality of enterprise dimensions;

associating, by at least one of the one or more computing devices, a process element variant for a process element to one or more values for one or more enterprise dimensions of the plurality of enterprise dimensions;

receiving, by at least one of the one or more computing devices, a process element execution request from at least one user, wherein the process element execution request comprises a requested process element;

determining, by at least one of the one or more computing devices, one or more enterprise dimensions from the plurality of enterprise dimensions and corresponding specific values for the one or more enterprise dimensions applicable to the process element execution request;

searching the dimensional hierarchy by the order defined for the plurality of enterprise dimensions, by at least one of the one or more computing devices, for a particular process element variant of the requested process element associated to the specific values of the one or more enterprise dimensions determined to be applicable to the process element execution request, wherein the searching comprises searching at a current enterprise dimension by iterating through successively higher levels of the current enterprise dimension until the particular process element variant corresponding to the plurality of enterprise dimensions is found and, if the particular process element variant is not found, returning to searching at an immediately higher enterprise dimension from the current dimension of the plurality of enterprise dimensions as provided by the dimensional hierarchy; and selecting, by at least one of the one or more computing devices, the particular process element variant for execution to accomplish the process element execution request.

2. The method of claim 1, wherein the plurality of enterprise dimensions comprises a process, an event, a location or an organization.

3. The method of claim 1, wherein the particular process element variant comprises a process, a sub process, an activity, a service, a business rule, a business event or a business controls.

4. The method of claim 1 further comprising:
searching, by at least one of the one or more computing devices, for a default process element variant if the particular process element variant associated to the specific values of the one or more enterprise dimensions determined to be applicable to the process element execution request is not found.

5. The method of claim 4 further comprising:
searching, by at least one of the one or more computing devices, for the particular process element variant in an immediate higher dimension of the dimensional hierarchy if a process element variant or the default process element variant for the specific values of the one or more enterprise dimensions determined to be applicable to the process element execution request is not found.

6. The method of claim 1, wherein the searching step continues until the particular process element variant is found or the one or more enterprise dimensions determined to be applicable to the process element execution request are exhausted.

7. The method of claim 1, wherein the dimensional hierarchy defines an order for a given set of possible values for a given enterprise dimension.

8. A system for selecting a particular process element variant in a business process, comprising:

one or more processors; and
one or more memories operatively coupled to at least one of the one or more processors and having instructions stored thereon that, when executed by at least one of the one or more processors, cause at least one of the one or more processors to:

configure a dimensional hierarchy for a plurality of enterprise dimensions, wherein an enterprise dimension has a set of possible values and the dimensional hierarchy is based on the respective sets of possible values for the plurality of enterprise dimensions, further wherein the dimensional hierarchy defines an order for the plurality of enterprise dimensions;

associate a process element variant for a process element to one or more values for one or more enterprise dimensions of the plurality of enterprise dimensions;

receive a process element execution request from at least one user, wherein the process element execution request comprises a requested process element, and the requested process element has one or more process element variants represented in the dimensional hierarchy;

determine one or more enterprise dimensions associated with the process element execution request, and further determine dimensional data for the associated one or more enterprise dimensions;

search the dimensional hierarchy for a particular process element variant of the requested process element corresponding to the dimensional data for the associated one or more enterprise dimensions by the order defined for the plurality of enterprise dimensions, wherein the searching comprises starting the search at an initial dimension level and iterating through successively higher levels of a current enterprise dimension until the particular process element variant corresponding to the dimensional data is found and, if the particular process element variant is not found, returning to searching based on an immediately higher dimension of the plurality of enterprise dimensions as provided by the dimensional hierarchy; and select the particular process element variant for execution to accomplish the process element execution request.

9. The system of claim 8, wherein the plurality of enterprise dimensions comprises a process, an event, a location or an organization.

10. The system of claim 8, wherein the particular process element variant comprises a process, a sub process, an activity, a service, a business rule, a business event or a business control.

11. The system of claim 8 wherein a default process element variant is searched for if a process element variant corresponding to the dimensional data for the associated one or more enterprise dimensions is not found.

12. The system of claim 11 wherein the particular process element variant is searched for in an immediate higher dimension of the dimensional hierarchy if a process element variant or the default process element variant corresponding to the dimensional data for the associated one or more enterprise dimensions is not found.

13. The system of claim 8 wherein the particular process element variant is searched for until the particular process element variant is found or the associated one or more enterprise dimensions are exhausted.

14. The system of claim 8 wherein:
searching does not require a complete set of rules for choosing the particular process element variant and instead chooses a most applicable variant based on the dimensional hierarchy.

15. At least one non-transitory computer-readable medium storing computer-readable instructions that, when executed by one or more computing devices, cause at least one of the one or more computing devices to:
configure a dimensional hierarchy for a plurality of enterprise dimensions, wherein an enterprise dimension has a set of possible values and the dimensional hierarchy is based on the respective sets of possible values for the plurality of enterprise dimensions, further wherein the dimensional hierarchy defines an order for the plurality of enterprise dimensions;
associate a process element variant for a process element to a value from the set of possible values for an enterprise dimension of the plurality of enterprise dimensions;
receive a process element execution request from at least one user, wherein the process element execution request comprises a requested process element, and the requested process element has one or more process element variants represented in the dimensional hierarchy;
determine a tuple of dimensional data associated with the process element execution request, wherein respective elements of the tuple correspond to respective enterprise dimensions of the plurality of enterprise dimensions;
search the dimensional hierarchy for a particular process element variant corresponding to the tuple of dimensional data, wherein the enterprise dimensions that correspond to the tuple are searched based on the order defined by the dimensional hierarchy, wherein the searching comprises starting the search at an initial dimension level and iterating through successively higher levels of a current enterprise dimension until the particular process element variant corresponding to the plurality of enterprise dimensions is found and, if the particular process element variant is not found, returning to searching based on an immediately higher dimension of the plurality of enterprise dimensions as provided by the dimensional hierarchy; and
select the particular process element variant for execution to accomplish the process element execution request.

16. The at least one non-transitory computer-readable medium of claim 15, wherein the plurality of enterprise dimensions comprises a process, an event, a location or an organization.

17. The at least one non-transitory computer-readable medium of claim 15, wherein the particular process element variant comprises a process, a sub process, an activity, a service, a business rule, a business event or a business controls.

18. The at least one non-transitory computer-readable medium of claim 15, wherein the instructions that, when executed by at least one of the one or more computing devices, cause at least one of the one or more computing devices to search for a default process element variant if a process element variant corresponding to the tuple of dimensional data is not found.

19. The at least one non-transitory computer-readable medium of claim 18, wherein the instructions that, when executed by at least one of the one or more computing devices, cause at least one of the one or more computing devices further to search for the particular process element variant in an immediate higher dimension of the dimensional hierarchy if a process element variant or the default process element variant corresponding to the tuple of dimensional data is not found.

20. The at least one non-transitory computer-readable medium of claim 15, wherein the search continues until the particular process element variant is found or the respective enterprise dimensions that correspond to the tuple of dimensional data are exhausted.

* * * * *